United States Patent
Schwandner

(10) Patent No.: US 7,017,799 B2
(45) Date of Patent: Mar. 28, 2006

(54) SPINDLE SLEEVE WITH TRANSPONDER

(75) Inventor: Frank Schwandner, Aachen (DE)

(73) Assignee: The Gates Corporation, Denver, CO (US)

( * ) Notice: Subject to any disclaimer, the term of this patent is extended or adjusted under 35 U.S.C. 154(b) by 464 days.

(21) Appl. No.: 10/005,083

(22) Filed: Dec. 4, 2001

(65) Prior Publication Data

US 2003/0102978 A1    Jun. 5, 2003

(51) Int. Cl.
*G06F 17/00* (2006.01)

(52) U.S. Cl. .................... 235/375; 235/384

(58) Field of Classification Search ............ 235/375, 235/487, 462.46, 486, 492, 384; 340/10.42, 340/447; 399/302, 333; 73/8
See application file for complete search history.

(56) References Cited

U.S. PATENT DOCUMENTS

| | | | | |
|---|---|---|---|---|
| 4,673,932 A | | 6/1987 | Ekchian et al. ....... 340/825.54 |
| 4,862,160 A | | 8/1989 | Ekchian et al. ....... 340/825.54 |
| 4,911,217 A | | 3/1990 | Dunn et al. ............ 152/152.1 |
| 5,028,918 A | | 7/1991 | Giles et al. .......... 340/825.54 |
| 5,441,212 A | * | 8/1995 | Dicken et al. ............. 242/532 |
| 5,483,827 A | * | 1/1996 | Kulka et al. .............. 73/146.5 |
| 5,648,765 A | | 7/1997 | Cresap et al. ........ 340/825.35 |
| 5,908,135 A | * | 6/1999 | Bradford et al. ............ 220/673 |
| 5,939,977 A | * | 8/1999 | Monson ..................... 340/442 |
| 5,942,987 A | | 8/1999 | Heinrich et al. ...... 340/825.54 |
| 5,983,799 A | * | 11/1999 | Lane et al. ................ 101/375 |
| 5,986,569 A | * | 11/1999 | Mish et al. ............. 340/10.42 |
| 6,036,179 A | * | 3/2000 | Rensel ................... 267/64.11 |
| 6,047,814 A | | 4/2000 | Alles et al. ........... 198/810.02 |
| 6,054,935 A | | 4/2000 | Urbas et al. ......... 340/870.17 |
| 6,147,604 A | * | 11/2000 | Wiklof et al. ........... 340/572.1 |
| 6,206,292 B1 | * | 3/2001 | Robertz et al. ............ 235/488 |
| 6,283,868 B1 | * | 9/2001 | Clarke et al. ................ 464/88 |
| 6,386,772 B1 | * | 5/2002 | Klinefelter et al. ........ 400/208 |
| 6,393,249 B1 | * | 5/2002 | Aslam et al. .............. 399/333 |
| 6,478,229 B1 | * | 11/2002 | Epstein ..................... 235/492 |
| 6,521,348 B1 | * | 2/2003 | Bunyan et al. ............ 428/457 |
| 6,555,181 B1 | * | 4/2003 | Santos et al. .............. 427/515 |

FOREIGN PATENT DOCUMENTS

| | | |
|---|---|---|
| DE | 299 03 840 U1 | 7/1999 |
| EP | 0 398 301 | 5/1990 |
| EP | 0 170 094 B2 | 10/1991 |
| EP | 0 798 241 A2 | 10/1997 |

(Continued)

*Primary Examiner*—Ahshik Kim
(74) *Attorney, Agent, or Firm*—J. A. Thurnau, Esq.; C. H. Castleman, Esq.; P. N. Dunlap

(57) ABSTRACT

The invention comprises a transponder moveably implanted into a pocket on an elastomeric spindle sleeve. The pocket comprises a plastic lining which is formed in the sleeve during cure or vulcanization. The transponder is inserted into the pocket once cure or vulcanization of the sleeve is complete. The open ends of the pocket are then sealed closed with an adhesive. Since the transponder is not molded into or otherwise bonded to the pocket during fabrication the transponder may move within the pocket. This minimizes stresses that may otherwise be transmitted to the transponder during flexing of the sleeve, thereby extending a transponder life. The transponder collects, stores and transmits manufacturing data which can be read by hand-held or stationary electronic devices. The transponder comprises a microchip and antenna in addition to a plastic or paper laminate upon which it is mounted. The transponder is activated by RF (Radio Frequency) energy received by the antenna and therefore needs no battery.

6 Claims, 3 Drawing Sheets

FOREIGN PATENT DOCUMENTS

| | | |
|---|---|---|
| EP | 0 798 241 A3 | 5/1998 |
| EP | 0 716 991 B1 | 6/1999 |
| FR | 2 697 801 | 5/1994 |
| WO | WO 97/34247 | 9/1997 |
| WO | 98/28213 | 7/1998 |
| WO | WO 98/33142 | 7/1998 |
| WO | WO 99/23024 | 5/1999 |
| WO | WO 99/29522 | 6/1999 |

* cited by examiner

SPINDLE SLEEVE WITH TRANSPONDER

FIELD OF THE INVENTION

The invention relates a spindle sleeve having a transponder, and more particularly, a spindle sleeve having a pocket to receive a transponder wherein the transponder is not bound to the pocket.

BACKGROUND OF THE INVENTION

Various spun materials, including glass fibers, are manufactured by a spinning process. As the fibers are spun they are wound on a spindle. The spindle will generally comprise a cardboard cylinder.

It is necessary to the manufacturing process that certain information be marked on each spindle once the manufacturing process is complete. This allows identification and tracking of the glass fiber on each spindle.

Typically, the information is marked on each spindle optically for reading by a person, or with a bar code reader.

Other non-optical means of marking and reading information are available. For example, transponders may be molded into a product. The transponder stores and transmits information as required by a user. The transponders are generally queried by an interrogator when the stored information is needed.

Representative of the art is U.S. Pat. No. 5,028,918 to Giles et al. (1991) which discloses a phase encoded transponder circuit which may be a passive device capable of response to an interrogating signal and is capable of transmitting an individual unique identification code.

Also representative of the art is EP 956537A1 to PAV Card GmbH which discloses a transmission module for contactless transmission of date between a ship and a reading device.

Also representative of the art is WO99/23024 to Wibmer GmbH which discloses a spool sleeve having interconnected layers, an inner layer fitted with a notch in which a correspondingly formed transponder is embedded whose mass is at least approximately the same as that of the piece of strip that has been cut out so no imbalance between the sleeve and transponder arises.

However, the prior art transponders are molded into the product. As such, they are susceptible to mechanical damage caused by stresses transmitted to the transponder resulting from flexing of the product. Repeated flexing of the transponder during use results in premature failure.

What is needed is a spindle sleeve having means for electronically processing data. What is needed is a spindle sleeve having a transponder for receiving and transmitting data. What is needed is a spindle sleeve having a sealable pocket for receiving a transponder. What is needed is a spindle sleeve having means for non-fixedly receiving a transponder. What is needed is a spindle sleeve having a sealable pocket located radially outward from tensile cords to minimize transmitted stresses. The present invention meets these needs.

SUMMARY OF THE INVENTION

The primary aspect of the invention is to provide a spindle sleeve having means for electronically processing data.

Another aspect of the invention is to provide a spindle sleeve having a transponder for receiving and transmitting data.

Another aspect of the invention is to provide a spindle sleeve having a sealable pocket for receiving a transponder.

Another aspect of the invention is to provide a spindle sleeve having means for non-fixedly receiving a transponder.

Another aspect of the invention is to provide a spindle sleeve having a sealable pocket located radially outward from tensile cords to minimize transmitted stresses.

Other aspects of the invention will be pointed out or made obvious by the following description of the invention and the accompanying drawings.

The invention comprises a transponder moveably implanted into a pocket on an elastomeric spindle sleeve. The pocket comprises a plastic lining which is formed in the sleeve during cure or vulcanization. The transponder is inserted into the pocket once cure or vulcanization of the sleeve is complete. The open ends of the pocket are then sealed closed with an adhesive. Since the transponder is not molded into or otherwise bonded to the pocket during fabrication the transponder may move within the pocket. This minimizes stresses that may otherwise be transmitted to the transponder during flexing of the sleeve, thereby extending a transponder life. The transponder collects, stores and transmits manufacturing data which can be read by hand-held or stationary electronic devices. The transponder comprises a microchip and antenna in addition to a plastic or paper laminate upon which it is mounted. The transponder is activated by RF energy received by the antenna and therefore needs no battery.

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
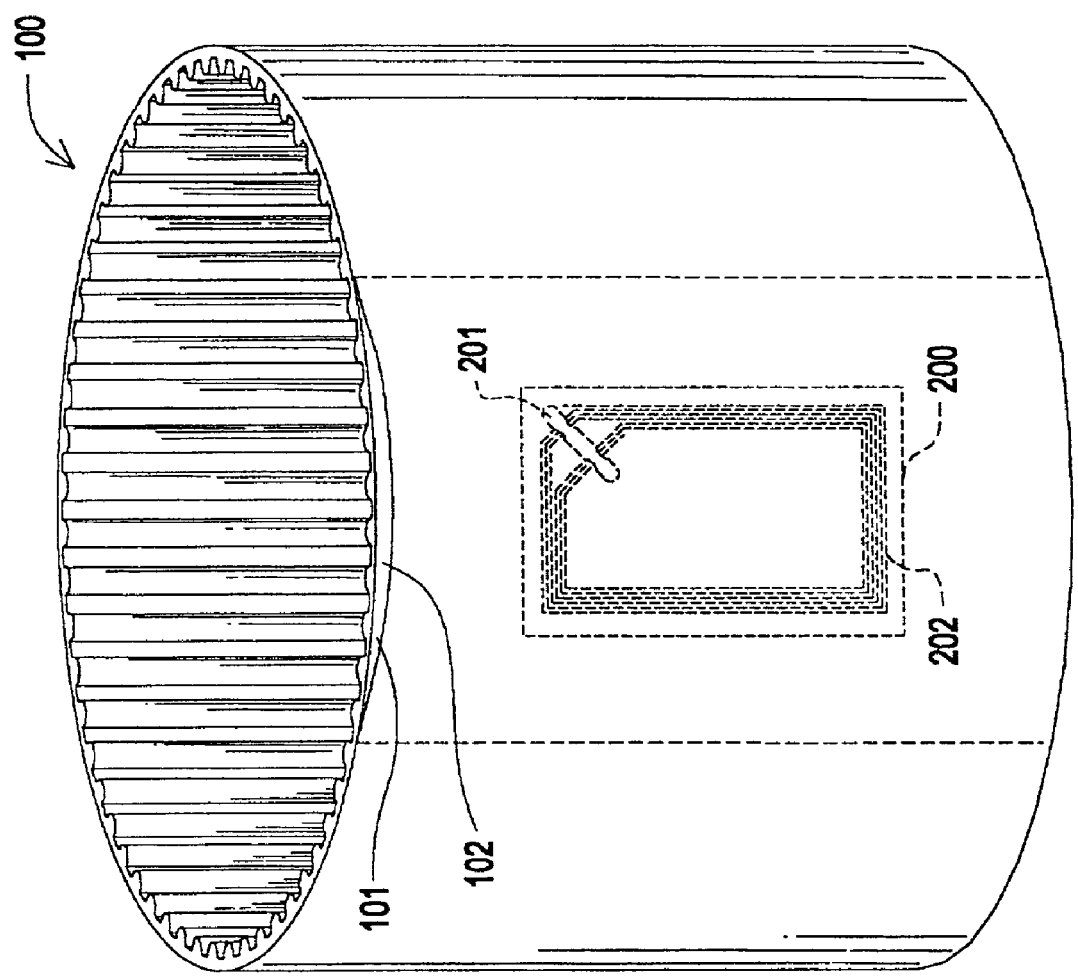
FIG. 1 is a perspective view of the transponder in the sleeve pocket.

FIG. 1 is a perspective view of the transponder in a sleeve pocket. The transponder 200 comprises a microprocessor 201 connected to a coil antenna 202. The transponder and antenna are sealed into a pocket 101 formed in elastomeric sleeve 100. The sleeve is then used, for example, on a spinning machine.

Sleeve 100 is fabricated in a manner known in the elastomeric belt fabricating art, namely, successive layers of elastomeric are built up on a build mandrel (not shown) During fabrication, a single piece 102 of polyester plastic is placed between elastomeric layers. Piece 102 may also comprise a woven or non-woven material depending on the temperature during use. Tensile cords are also wound on the sleeve build, see FIG. 4. The sleeve is fabricated with tensile cords wound in a longitudinal direction in order to resist the centrifugal forces generated by the spinning process. The sleeve may experience rotational speeds of 5000 RPM or greater. The tensile cords may comprise polyester, fiberglass, nylon 6.6, nylon 4.6, aramid, cotton and equivalent materials known in the art. The built-up belt is then cured or vulcanized by application of heat and pressure. The vulcanized slab may then be cut into individual sleeves.

Piece 102 is laminated between successive layers of elastomeric to form a void comprising a receiving portion or pocket 101. Piece 102 prevents adjacent elastomeric layers from bonding together across the piece. Piece 102 is oriented radially outwardly of the tensile cords, between the tensile cords and an overcord elastomeric layer 105, see FIG. 4. This prevents the transponder from being crushed between a spinner mandrel and the tensile cords when the sleeve is installed on a spinning machine, see FIG. 3. Piece 102 may comprise any non-metallic material that will bond on only a single side to the elastomeric during cure or vulcanization. This assures a receiving pocket will be formed and maintained during vulcanization or cure without the layers of elastomeric bonding together. Further, piece 102 is non-metallic so as not to interfere with the RF signals received by or transmitted from the transponder antenna. Alternatively, piece 102 may be removed from the sleeve after curing or vulcanization in order to give the proper finished sleeve thickness t, see FIG. 4, once the transponder is inserted. Various thicknesses of piece 102 may be used to achieve a proper finished sleeve thickness.

Alternatively, a portion of the elastomeric layer containing the pocket may be omitted during fabrication representing the thickness of the transponder plus piece 102 so that a proper uniform finished thickness about an entire circumference will be achieved when the transponder is inserted into the pocket.

Once the vulcanization or cure is complete, the belt built is cut into the appropriate widths, each width having a pocket 101. Transponder 200 is inserted into pocket 101. Once the transponder is inserted, the open ends of the pocket 111 are sealed shut using any suitable adhesive such as cyanacrylate or any equivalents thereof, see FIG. 4.

Although the ends of the pocket are sealed closed, the transponder is not sealed to the pocket. Instead, the transponder is free to move about within the sealed pocket, minimizing or eliminating stresses otherwise transmitted to the transponder by flexing of the sleeve during removal from a spinning machine, or during removal from a glass coil.

Figure 2:
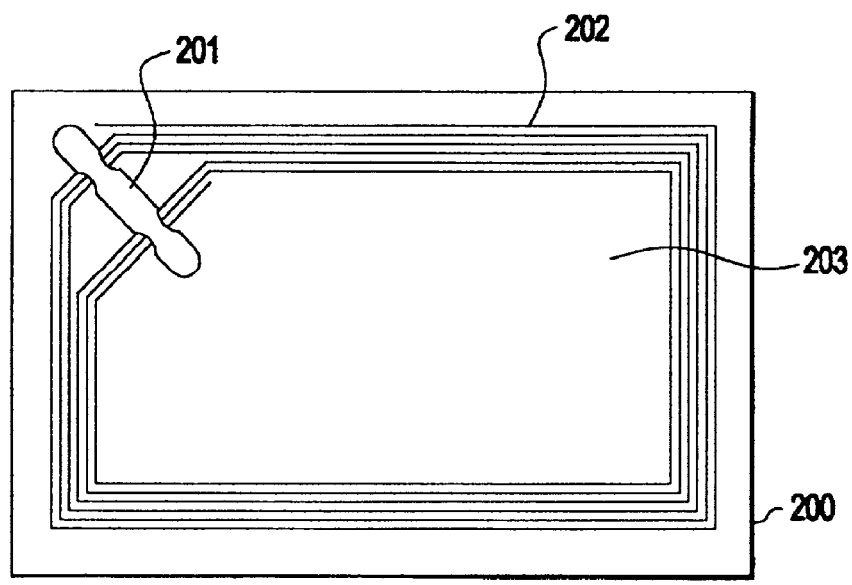
FIG. 2 is a plan view of a transponder.

FIG. 2 is a plan view of a transponder. The transponder 200 is a passive device without an internal power supply. The transponder receives a radio frequency (RF) or clock signal from an interrogator. It accumulates voltage through the coil antenna 202 from the input signal. The transponder uses the accumulated voltage from the interrogating signal to power the processor 201, which reads the memory and transmits the appropriate response back to the interrogator.

Transponders of the type described above are known in the art. For example, and not by way of limitation, a suitable transponder is manufactured by PAV Card GmbH, Germany. The specific product is PAV model no. 16A-MIR. The processor 201 and coil antenna 202 are laminated on a durable flexible plastic material 203. An overall thickness of the laminated transponder is less than 1 mm. This form of transponder is extremely thin and wear resistant and is especially suitable to the application where sleeve overall thickness is limited to a maximum of approximately 3 mm. This example is not offered by way of limitation as any equivalent transponder will perform as well. Material 203 is non-metallic so as not to interfere with RF signals.

Figure 3:
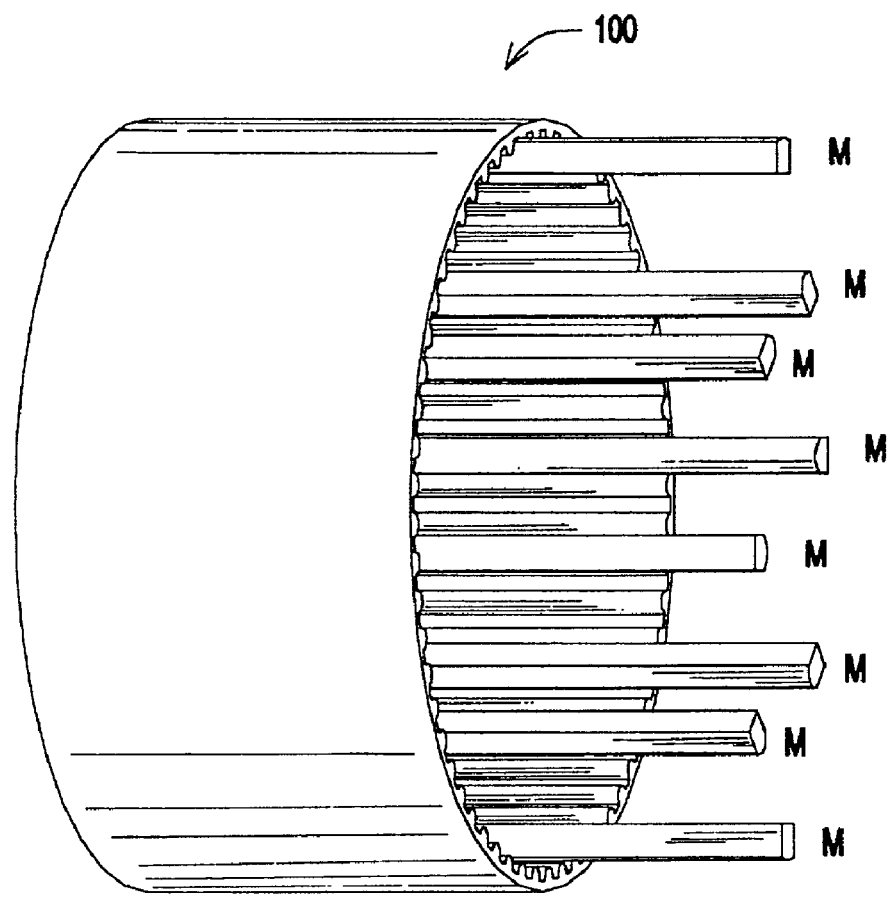
FIG. 3 is a perspective view of a spinning machine mandrel portion including an inventive sleeve.

FIG. 3 is a perspective view of a spinning machine portion including an inventive sleeve. In use, the rubber sleeve containing the transponder is mounted in a spinning machine, for spinning glass fibers for example. The spinning machine comprises a mandrel portion, shown in part in FIG. 3, upon which a coil is spun. The depiction of the mandrel portion M in FIG. 3 is an illustrative example and not offered as a limitation to a particular form or style of spinning machine. Mandrel projections M describe a generally cylindrical form. The mandrel portion is manipulated by a spinning machine in a manner known in the art. The inventive sleeve has a generally belt-like shape that is placed over the mandrel portion.

The material is then spun onto the sleeve during fabrication. Once the sleeve is loaded with a fiber coil, the mandrel portion M is collapsed inward and removed from an inner diameter of the sleeve. The coil remains on the flexible sleeve during handling and shipping. Once the coil is received by a user the transponder is read. The flexible sleeve is folded inward upon itself and removed from the glass fiber coil. This results in a considerable savings over methods that require a spindle, such as a cardboard spindle, that must be dedicated to each coil of glass fibers and are discarded after a single, or very few uses. Unlike cardboard spindles, the inventive sleeve can then be reused by the manufacturer, the number of uses only limited by the durability of the sleeve itself.

In operation, prior to or during the spinning operation, the manufacturing information relating to the material wound upon the sleeve is determined by a user. The information is loaded into the transmitter. The transmitter then transmits the information to the transponder in the sleeve. The information is stored in the memory portion of the transponder.

An interrogator at the point of use queries the transponder in the sleeve. In response to the interrogator signal, the transponder transmits the information loaded during manufacture which is descriptive of the particular material wound on the sleeve. The transponder is read without use of any optical reader, such as one would use with a bar-code reader. As noted, the transponder processor has a read/write capability that allows the sleeve to be used repeatedly.

Figure 5:
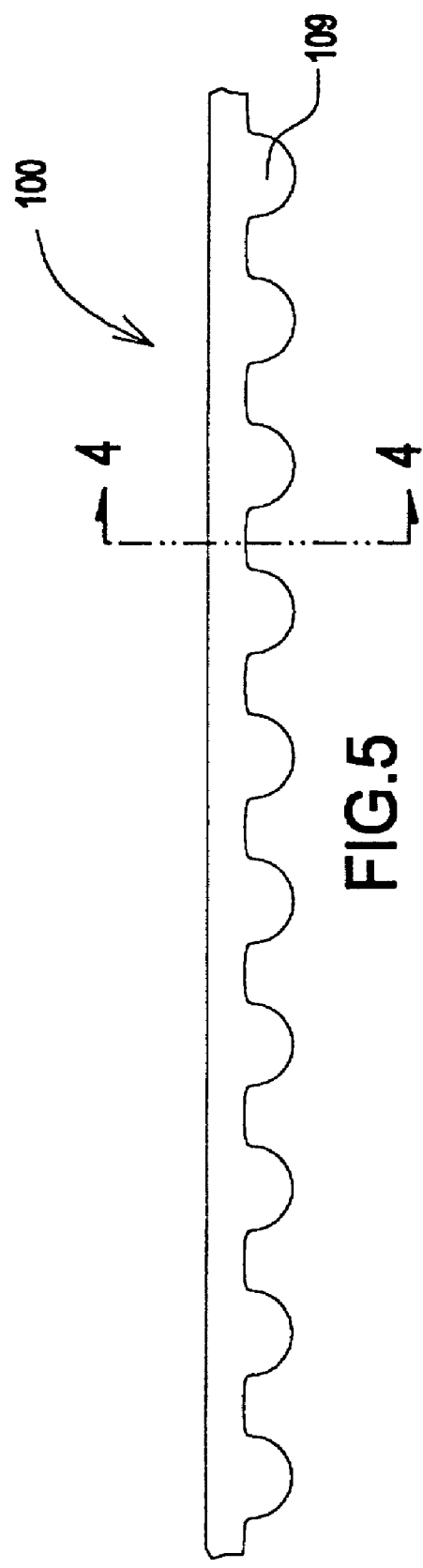
FIG. 5 is a sleeve tooth profile.
Figure 4:
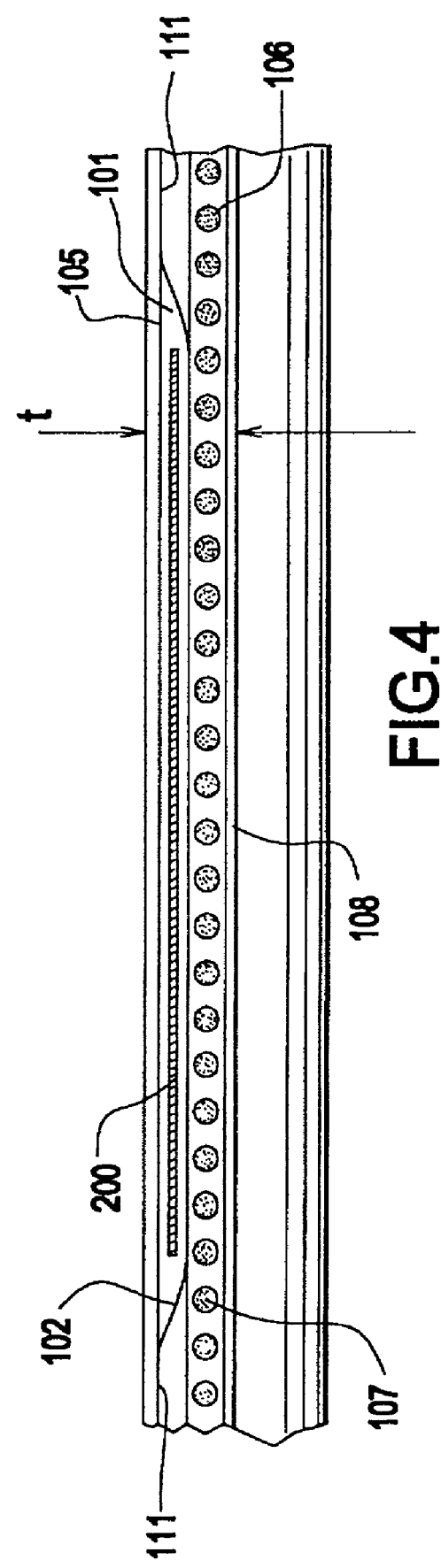
FIG. 4 is a cross-sectional view of the inventive sleeve at 4—4 in FIG. 5.

FIG. 4 is a cross-sectional view of the inventive sleeve at 4—4 in FIG. 5. Transponder 200 is shown contained in pocket 101. Pocket 101 is formed of piece 102 between elastomeric layer 105 and tensile cords 107. Elastomeric layer 108 comprises an undercord layer. The sleeve may have a toothed profile 109, see FIG. 5, to enhance engagement between the sleeve and a mandrel portion. The sleeve may also omit a toothed profile, or have a toothed profile on a side opposite that shown in FIG. 5.

Although a single form of the invention has been described herein, it will be obvious to those skilled in the art that variations may be made in the construction and relation of parts without departing from the spirit and scope of the invention described herein.

I claim:

1. A sleeve comprising:
   an elastomeric body;
   a receiving portion formed in the elastomeric body, the receiving portion bondable only to the elastomeric body; and
   the receiving port:ion having a shape suitable for receiving an electronic data logger, the electronic data logger comprising a transponder sealed within the receiving portion after a vulcanization of the elastomeric body; and
   the transponder comprising a data receiving portion, a data storage portion and a data transmitting portion; and
   the transponder is moveable within the receiving portion.

2. The sleeve as in claim 1, wherein the transponder comprises a thickness less than 2 mm.

3. The sleeve as in claim 1 further comprising tensile cords wound in the elastomeric body in a longitudinal direction.

4. The sleeve as in claim 1, wherein the receiving portion is sealable.

5. The sleeve as in claim 4, wherein the receiving portion is radially outward from a tensile cord.

6. The sleeve as in claim 5 further comprising a toothed profile.

* * * * *